Nov. 29, 1966 W. A. MELANSON 3,289,057
ADJUSTABLE CAPACITOR WITH MOVING DIELECTRIC
Filed June 9, 1965

INVENTOR.
WILLIAM A. MELANSON
BY Roberts, Cushman & Grover
attys.

United States Patent Office 3,289,057
Patented Nov. 29, 1966

3,289,057
ADJUSTABLE CAPACITOR WITH MOVING DIELECTRIC
William A. Melanson, Lexington, Mass., assignor to Cambridge Thermionic Corporation, Cambridge, Mass., a corporation of Massachusetts
Filed June 9, 1965, Ser. No. 462,498
8 Claims. (Cl. 317—249)

The field of this invention is that of variable capacitance devices, more particulary of such devices whose impedance can be adjusted by movement of one electrode element relative to a second electrode element.

Ceramic or materials or similar characteristics are for many purposes the most desirable dielectric medium in variable capacitance devices. In conventional capacitors of this sort, a fixed outer plate element is usually secured to the periphery of a ceramic tube and a movable core element is disposed for axial movement within the ceramic tube. Yet, ceramics, however desirable as dielectrics, have inherent limitations. It is very difficult to obtain precise gap dimensions and alignment within a fixed dielectric by boring or internally grinding any given tube, and therefore the performance of a capacitor utilizing such material is limited by the presence of surface irregularities and eccentricities which in turn limit the closeness of fit between the movable core element and the inner surface of the ceramic, and the alignment thereof. Further, because ceramic is brittle, a stationary ceramic tube with a thin metal coating on the outside must be relatively thick for strength and self-support. This thickness of the dielectric reduces the capacitance of the device and tends to increase its overall size. In miniature circuitry applications these limitations of dielectric thickness, gap size and alignment accuracy are accentuated.

Objects of the present invention are to provide variable capacitance devices having optimally thin good dielectrics and an optimally regular gap of any desired minimal dimension; to provide a capacitor which can be finely and accurately adjusted at a uniform rate including complete separation of the electrodes, with exact yet easy guidance of a movable core throughout its path of adjustment, and which will reliably retain such adjustment; to provide such a device which can be precision manufactured and assembled at comparatively low cost; and to provide capacitors of this type into which such properties can be incorporated regardless of smallness of physical size.

The substance of the invention can be briefly summarized as follows.

The variable capacitance device according to the invention includes, in a principal aspect, a cylindrical hollow electrode at one end of support means and an internally threaded guiding sleeve at the other end of the support means in coaxial relation with the hollow electrode. A threaded adjustment stud is engaged at one end in the threaded guiding sleeve and carries at its other end a second, cylindrical, core electrode. Surrounding this second electrode, and permanently affixed thereto, is a very thin tubular insulating body which comprises the dielectric material. The construction according to the invention is particularly suitable for the use of ceramic material for that purpose. The second electrode, with the insulating body thereon, is slidable within the hollow electrode whereby the capacitance of the device can be adjusted by means of the adjustment stud and the guiding sleeve.

In further valuable aspects, the support means includes a palstic sleeve that extends between the hollow electrode and the threaded guiding sleeve, which plastic sleeve is slightly elastic to permit exact axial alignment between the close fitting hollow electrode and the second electrode with the dielectric thereon. The plastic sleeve constituting the support means has the same inner profile as the hollow electrode, such that the dielectric is securely guided throughout its path of adjustment. The dielectric body extends beyond the free end of the second electrode such that this body reaches into the hollow electrode when the second electrode is wholly withdrawn therefrom. A frictional torque device which resists accidental rotation of the adjustment stud is preferably applied between support means and adjustable electrode.

These and other objects and aspects of this invention will appear from the following detailed description of practical embodiment illustrating its novel characteristics.

The description refers to a drawing in which

Figure 2:
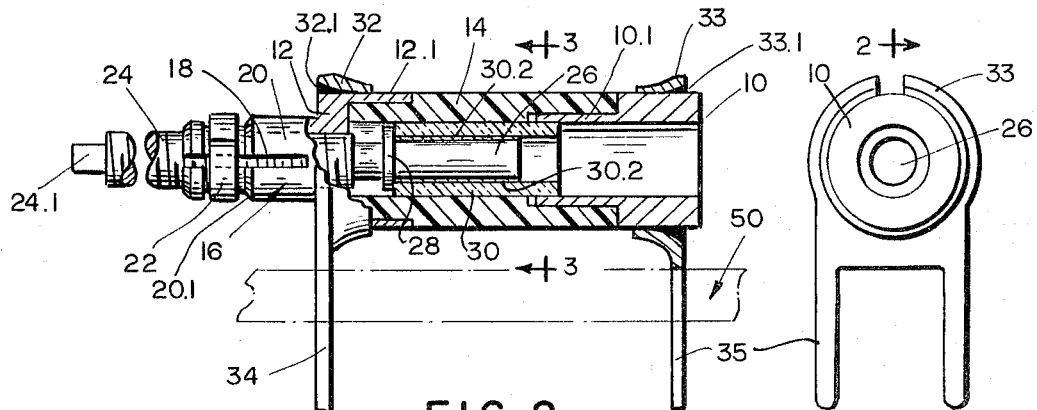
FIG. 2 is a section on line 2—2 of FIG. 1 with part in elevation.
Figure 1:
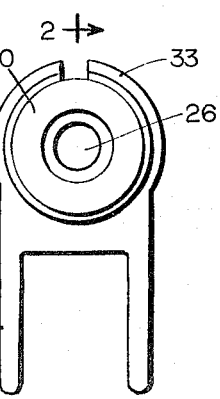
FIG. 1 is an end elevation of a variable capacitor according to the invention.
Figure 3:
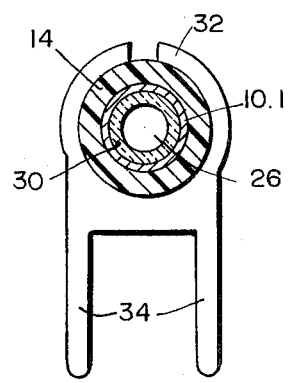
FIG. 3 is a section on line 3—3 of FIG. 2.
Figure 4:
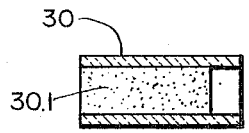
FIG. 4 is an axial section of the ceramic body according to the invention.

Referring to FIGS. 1-3, numeral 10 indicates the cylindrical hollow outer electrode of the capacitor and 12 indicates a threaded guiding sleeve which is interconnected to the hollow electrode 10 by a plastic sleeve 14 these parts also constituting a support means. The plastic sleeve 14 is preferably of epoxy, styrene, polycarbonate or other suitable synthetic resinous material having a slight elasticity; it can be precision molded or precision machined from stock. The sleeve 14 has at one end an inner recess fitting the off set portion 10.1 of the electrode cylinder 10, and the other annularly recessed end of 14 fits the larger end 12.1 of the sleeve 12. At the other end, sleeve 12 has a hollow stud 16 that is split at 18 to form elastic fingers 20. The fingers have a neck 20.1 that confines an annular constricting spring 22. Engaged in the threaded guiding sleeve 12 and its fingers 20 is a threaded adjustment stud 24 which has a core body 26, and a collar 28. The stud 24 is flattened at 24.1 to provide a face for engagement by an adjusting tool.

The core 26 constitutes the second, cylindrical, electrode and is made, together with stud 24, of low expansion metal. The dielectric is a thin, tubular, ceramic body 30 that surrounds and is permanently fixed to the electrode core 26. Thus, by means of the adjustment stud 24 and the guiding sleeve 12 the core together with the dielectric is slidable within the hollow electrode 10 and the sleeve 14. The length of the ceramic body 30 is such that one end abuts the collar 28 and the other extends beyond the second electrode 32 to remain within the hollow fixed electrode 10 when the second, core, electrode 26 is wholly withdrawn therefrom. This position is shown in FIG. 2. It will be noted by comparison of FIGS. 2 and 7 that the recess of sleeve 14 and the offset of electrode 10 provide a smooth path for the dielectric 30, from minimum to maximum adjustment. This continuous guidance permits the use of ceramic tubes 30 of minimal thickness, preventing damage during shock and vibration due to lack of containment.

The hollow electrode 10 and the guiding sleeve 12 carry mounting and terminal rings 32, 33, respectively, with laterally extending forked solder lugs 34, 35. The rings 32, 33 are soldered to electrode 10 and sleeve 12, as indicated at 32.1 and 33.1.

The capacitor is mounted for example on a printed circuit panel such as 50, by means of the lugs 34, 35 which also serve as connecting terminals leading to the electrodes 26 and 10, respectively.

The electrode core 26 and the dielectric 26 are permanently fixed to each other as a subassembly by way of a technique according to the invention, which process will now be described.

Figure 5:
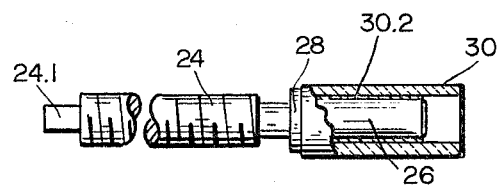
FIG. 5 is a side elevation, partly in section, of the inner electrode subassembly.

The dielectric body 30 is preferably made of ceramic material such as silicates or titanates, with chip-free ends cut from tubular stock. Its inside is then coated, over the area 30.1 (stippled in FIG. 5), with silver paint and then fired. The area 30.1 thus silvered is then tinned with silver bearing soft solder. Commercially available flux is then applied to the core electrode 26, the latter inserted into the ceramic tube close to the collar 28 and the two parts are then soldered together by induction heating. The solder is indicated at 30.2 of FIGS. 2 and 5. Care is taken to remove residual flux from the core electrode. Care is also taken that the solder inside the sleeve 30 does not extend beyond the core 26, which might cause bridging or irregular adjustment.

Upon machining the movable part with stud 24 and core 26, care is taken that the core surface is exactly concentric with the outside diameter of the stud thread. The outside of the dielectric tube (now firmly fixed to the core) is precision finished such as ground on the centers of core and thread, to be exactly concentric with the thread. The outer electrode 10 and the insulating sleeve 14 are precision shaped with all diameters concentric to each other. A high grade commercial thermosetting cement such as an epoxy resin is then applied to the reduced ends 10.1 and 12.1 of electrode 10 and sleeve 14, and using a suitable aligning fixture the three parts are inserted into each other and the cement allowed to cure on the fixture in order to establish permanent alignment and concentricity of all diameters.

It will now be evident that this method of manufacture including especially the precision finishing of the dielectric 30 on the core 26, with common centers, makes possible a precision fit, with minimal gap between the moving dielectric 30 and the outer electrode, and exact linear guidance of the critical impedance components.

The moving electrode assembly including stud 24 is assembled with the outer electrode, including stud 16 and fingers 20, from the open end of the latter. The electrode 10 can be made with a closed end (not shown), and in that case the core with dielectric can be inserted in sleeve 12 prior to assembly.

Thus, in the assembled capacitor, the movable electrode 26 with the dielectric body 30 fixed thereon is axially aligned with the fixed hollow electrode 10. The slight elasticity of the plastic sleeve 14 permits correction of an unintentional misalignment if such should be required. The width of the air gap thus formed by the opposed precision finished surfaces can be controlled to a high degree of uniformity and accuracy, a gap width of .001 inch being easily attained. Performance characteristics are also enhanced by the very thin dielectric ceramic body 30 which yields a high capacitance with minimum capacitor size. Also, when the core electrode 26 is wholly withdrawn from the hollow electrode 10, the end of the ceramic body 30 remains within the hollow electrode whereby the axial alignment of these elements is maintained. The collar 28 protects the electrode 26 and the ceramic body 30 from injurious contact with the guiding sleeve 12. Accidental rotation of the adjustment stud 24 is prevented by the frictional torque created by the annular spring 22 which constricts the fingers 20 of the hollow stud 16 about the stud 24.

Figure 7:
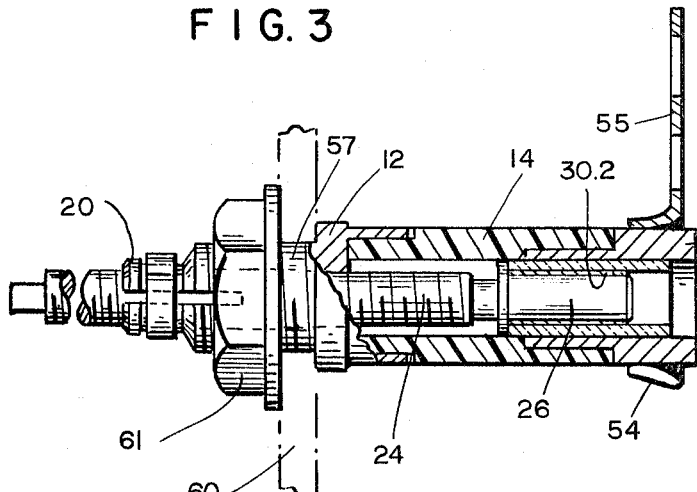
FIG. 7 is a section on line 7—7 of FIG. 6 with part in elevation, similar to FIG. 2.
Figure 6:
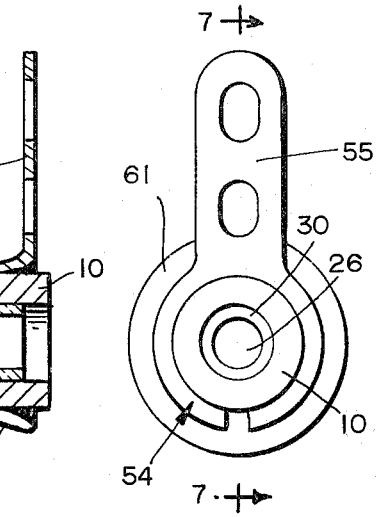
FIG. 6 is an end elevation similar to FIG. 1, showing an alternative embodiment of the invention.

FIGS. 6 and 7 show an embodiment that incorporates an alternative mounting and terminal means. With the exception of these, the embodiment is identical with that of FIGS. 1–5 and corresponding components are identically indicated. It will be noted however that FIG. 7 shows the second electrode 26 with the ceramic body 30 thereon advanced within the hollow electrode 10 instead of withdrawn as in FIG. 2.

The mounting and terminal bracket 54 has here a laterally extended single soldering lug 55 with perforations. At the guiding sleeve 12, an outside threaded portion 57 is added between the sleeve 12 proper and the fingers 20, retaining the split 18 and the annual spring 22. For mounting this capacitor, the stud 57 is inserted in the socket of a terminal board for example 60, and fastened thereto with a nut 61 as indicated in FIG. 7.

It should be understood that the present disclosure is for the purpose of illustration and that this invention includes all modifications which fall within the scope of the appended claims.

I claim:
1. A variable capacitor comprising:
   a hollow electrode;
   a guiding sleeve;
   tubular support means for carrying said hollow electrode at one end and said guiding sleeve at the other end, and having the same cross sectional inner configuration as said hollow electrode;
   a second electrode;
   an adjustment stud engaging at one end said sleeve and carrying at the other end said second electrode; and
   a tubular dielectric body surrounding, and permanently fixed to, said second electrode and slidable within said hollow electrode and said support means which together provide a continuously smooth guide for the dielectric body through its entire path of sliding adjustment.
2. Capacitor according to claim 1 wherein said tubular dielectric body is of ceramic material and of minimal thickness, relying for support and maintenance of its shape upon said second electrode and said tubular support.
3. Capacitor according to claim 1 wherein said sleeve and said adjustment stud engage with threads and the adjustment stud has a collar connecting it to said second electrode and abutting said tubular dielectric body.
4. A variable capacitor suitable for miniaturization comprising:
   a cylindrical hollow electrode;
   a solid cylindrical electrode;
   an inside threaded guiding sleeve;
   hollow support means made of a slightly elastic plastic material, for carrying said hollow electrode at one end and said guiding sleeve at the other end;
   a threaded adjustment stud engaging at one end said threaded guiding sleeve and carrying at the other end said solid electrode for sliding movement within said support means and said hollow electrode; and
   a thin tubular ceramic body surrounding, and permanently fixed to said solid electrode, the ceramic body and the hollow electrode being precision finished to form an exactly uniform narrow gap.
5. A variable capacitor suitable for miniaturization comprising:
   a cylindrical hollow electrode whose inner surface is precision finished to an exact inner diameter;
   an inside threaded guiding sleeve;
   support means including a slightly elastic plastic tube for carrying said hollow electrode at one end, and said threaded guiding sleeve at the other end;
   terminal means disposed at said hollow electrode and at said guiding sleeve;
   a solidly cylindrical electrode;
   an adjustment stud threaded at one end for engaging said guiding sleeve, carrying at the other end said cylindrical electrode, and having a collar between said second electrode and said threaded end; and
   a thin tubular ceramic body surrounding and permanently fixed to said solid electrode and slidable with that electrode within said hollow electrode, the outer surface of said ceramic body being precision finished to an exactly dimensioned outer diameter closely fitting said hollow electrode, the opposed surfaces of said hollow electrode and said ceramic body providing an exact and minimal air gap.

6. A variable capacitor according to claim 5 wherein mounting and terminal means extends laterally from at least one of said guiding sleeve and said hollow electrode.

7. A variable capacitor according to claim 5 wherein said guiding sleeve has an outside thread serving as a mounting means.

8. Capacitor according to claim 1 wherein said hollow electrode has an outside offset and said tubular support has an inner recess fitting said offset of the electrode to provide said continuously smooth path for the dielectric body.

References Cited by the Examiner

UNITED STATES PATENTS

| | | | |
|---|---|---|---|
| 2,163,410 | 6/1939 | Pulfrich | 29—473.1 |
| 2,768,338 | 10/1956 | Williams | 317—249 |
| 3,142,886 | 8/1964 | Bronson | 317—242 |
| 3,219,893 | 11/1965 | Clark | 317—249 |

LEWIS H. MYERS, *Primary Examiner.*

LARAMIE E. ASKIN, *Examiner.*

E. GOLDBERG, *Assistant Examiner.*